United States Patent
Shioiri et al.

(10) Patent No.: US 12,529,208 B2
(45) Date of Patent: Jan. 20, 2026

(54) WORKING VEHICLE

(71) Applicant: TAKEUCHI MFG. CO., LTD., Nagano (JP)

(72) Inventors: Yuichi Shioiri, Nagano (JP); Yuta Kobayashi, Nagano (JP)

(73) Assignee: TAKEUCHI MFG. CO., LTD., Nagano (JP)

( * ) Notice: Subject to any disclaimer, the term of this patent is extended or adjusted under 35 U.S.C. 154(b) by 432 days.

(21) Appl. No.: 18/223,139

(22) Filed: Jul. 18, 2023

(65) Prior Publication Data
US 2024/0287759 A1    Aug. 29, 2024

(30) Foreign Application Priority Data
Feb. 27, 2023 (JP) ................................. 2023-027881

(51) Int. Cl.
*E02F 9/08* (2006.01)
(52) U.S. Cl.
CPC .......... *E02F 9/0883* (2013.01); *E02F 9/0891* (2013.01)
(58) Field of Classification Search
CPC ....... B60K 15/05; E02F 9/0883; E02F 9/0891
USPC ......................................................... 280/834
See application file for complete search history.

(56) References Cited

U.S. PATENT DOCUMENTS

| | | | | |
|---|---|---|---|---|
| 1,662,820 | A * | 3/1928 | Condupa | B60R 17/00 280/853 |
| 4,530,537 | A * | 7/1985 | Allen | B60K 15/05 296/97.22 |
| 8,695,827 | B2 * | 4/2014 | Klauer | B60K 13/04 141/369 |
| 9,027,688 | B2 * | 5/2015 | Okuda | G01F 23/64 180/89.2 |
| 9,677,248 | B2 * | 6/2017 | Nakano | E02F 9/0883 |
| 10,458,160 | B2 * | 10/2019 | Setaki | E02F 9/24 |
| 11,155,157 | B2 * | 10/2021 | Nistler | B60K 15/03 |
| 2018/0038075 | A1 * | 2/2018 | Yamada | E02F 9/0866 |
| 2020/0123941 | A1 * | 4/2020 | Paulson | F01M 11/0458 |

FOREIGN PATENT DOCUMENTS

| JP | 2004114760 | A | * | 4/2004 |
| JP | 6463537 | B1 | | 2/2019 |

* cited by examiner

Primary Examiner — Alentin Neacsu
Assistant Examiner — Hosam Shabara
(74) Attorney, Agent, or Firm — WHDA, LLP

(57) ABSTRACT

A working vehicle includes: a filler port having a resiliently deformable hose communicating with a liquid storage part, a lid mechanism mounted to an upper end of the hose to open and close the filler port, and a moving mechanism. The moving mechanism includes: a fixing part pivotably coupled to the vehicle body and having the lid mechanism or the hose; an operating part pivotably coupled to the fixing part and including a knob; and a slide support fixed to the vehicle body and including a sliding hole for slidably inserting the knob therethrough to define a sliding range, and a locking recess. The fixing part or the operating part includes a locking projection.

12 Claims, 4 Drawing Sheets

WORKING VEHICLE

CROSS-REFERENCE TO RELATED APPLICATION

This application is based upon and claims the benefit of priority of the prior Japanese Patent Application No. P2023-027881, filed on Feb. 27, 2023, and the entire contents of which are incorporated herein by reference.

TECHNICAL FIELD

The present invention relates to a working vehicle equipped with a working unit configured to be operated hydraulically.

BACKGROUND ART

Examples of the working vehicle known in the related art include hydraulic excavators and track loaders equipped with a travel unit and a working unit driven by an engine (internal combustion engine).

Working vehicles driven by an electric motor instead of the engine of the related art are also developed in recent years (see Patent Literature 1: JP6463537).

SUMMARY OF INVENTION

Technical Problem

In working vehicles, various types of liquid required for an operation of equipment mounted on a vehicle body are stored in storage parts or other locations for use. Examples of the liquid include hydraulic oil and cooling water. The liquid is filled through a filler port when decreased or when replacement is necessary.

Whether a drive source is an engine or an electric motor, reduction in size of the vehicle body of the working vehicle is always an issue.

In particular, in a configuration of the working vehicle equipped with an electric motor as a drive source, a rechargeable battery (such as a large battery cell) is mounted on the vehicle body in addition to the electric motor. This makes it more difficult to secure a mounting space than in the working vehicles equipped with the engine of the related art, resulting in an issue of increase in size of the vehicle body.

In addition, since the engine that serves as a heat source is not mounted, a liquid heater for heating cooling water (cooling water (liquid) for a cab heater) to be flowed through a heater core is mounted correspondingly when the cab heater for heating a cab is provided. This makes it more difficult to secure the mounting space.

Solution to Problem

In view of such circumstances described above, it is an object of the present invention to provide a working vehicle which implements a simply-configured filler port that can be moved in position without the use of tools, can be stored in a small space, and can be pulled out to supply liquid when filling, thereby achieving reduction in size of a vehicle body.

The present invention has been accomplished under the solutions as disclosed below.

The working vehicle according to an embodiment is a working vehicle having a vehicle body, a travel unit, and a hydraulically operated working unit, including: a filler port for supplying liquid required for operating equipment mounted on the vehicle body, wherein the filler port includes a resiliently deformable hose in communication with a storage part of the liquid, a lid mechanism mounted to an upper end of the hose and configured to open and close the filler port, and a moving mechanism configured to move the position of the lid mechanism and the hose continuing from the lid mechanism, the moving mechanism includes: a fixing part which is pivotably coupled to the vehicle body and to which the lid mechanism or the hose is fixed; an operating part pivotably coupled to the fixing part and including a knob to be held by an operator; a slide support fixed to the vehicle body and including a sliding hole configured to slidably insert the knob therethrough and define a sliding range and a locking recess opening upward; and a locking projection provided on the fixing part or the operating part and configured to be engaged with and disengaged from the locking recess.

According to the configuration described above, a simply-configured liquid filler port that can be moved in position without the use of tools is implemented. Storage of the filler port is achieved only by securing a space having at least a size equivalent to a profile of the lid mechanism and the hose, and the lid mechanism and the hose can be pulled out from inside to outside of the vehicle body to supply liquid when filling. Therefore, it is not necessary to provide a large space for the entry of a filler nozzle and container above the filler port, thereby achieving reduction in size of the vehicle body.

The hose is preferably formed of a transparent or translucent material that provides visibility of liquid level of the liquid.

Preferably, the lid mechanism and the hose continuing from the lid mechanism are stored in a state of being pushed into the vehicle body from the outside toward the inside, and the fixing part, the operating part, and the slide support of the moving mechanism mounted to the vehicle body are positioned so that, in a state in which the operator lifts the knob upward and the locking projection is disengaged from the locking recess, the lid mechanism and the hose continuing from the lid mechanism move from the inside toward the outside of the vehicle body either by an operator holding and pulling out the lid mechanism or the hose continuing from the lid mechanism, or by a resilient force of the hose or a gravitational force acting on a center of gravity of the lid mechanism.

As an example, the working vehicle includes an electric motor serving as a drive source for the travel unit or the working unit, the liquid is cooling water for the cab heater, and the lid mechanism includes a plug for the hose and a plug fixing part having a threaded hole to which the plug for the hose is screwed.

As another example, the working vehicle includes an engine serving as a drive source for the travel unit or the working unit, and the liquid is at least one of fuel and engine oil.

As another example, the liquid is at least one of hydraulic oil or windscreen washer fluid.

Advantage of the Invention

According to the present invention, the filler port that can be moved in position without the use of tools, can be stored in a small space and can be pulled out to supply liquid when filing is implemented. Therefore, the reduction in size of the vehicle body is achieved.

BRIEF DESCRIPTION OF DRAWINGS

FIGS. 5A, 5B, and 5C are explanatory perspective views of an operation to move the filler port of the working vehicle in FIG. 1, in which FIG. 5A illustrates a state in which a locking projection engages a locking recess, FIG. 5B illustrates a state in which an operator lifts the knob upward and the locking projection is disengaged from the locking recess, and FIG. 5C illustrates a state in which a lid mechanism and a hose continuing from the lid mechanism are moved from inside toward outside of a vehicle body.

DESCRIPTION OF EMBODIMENT

Figure 1:
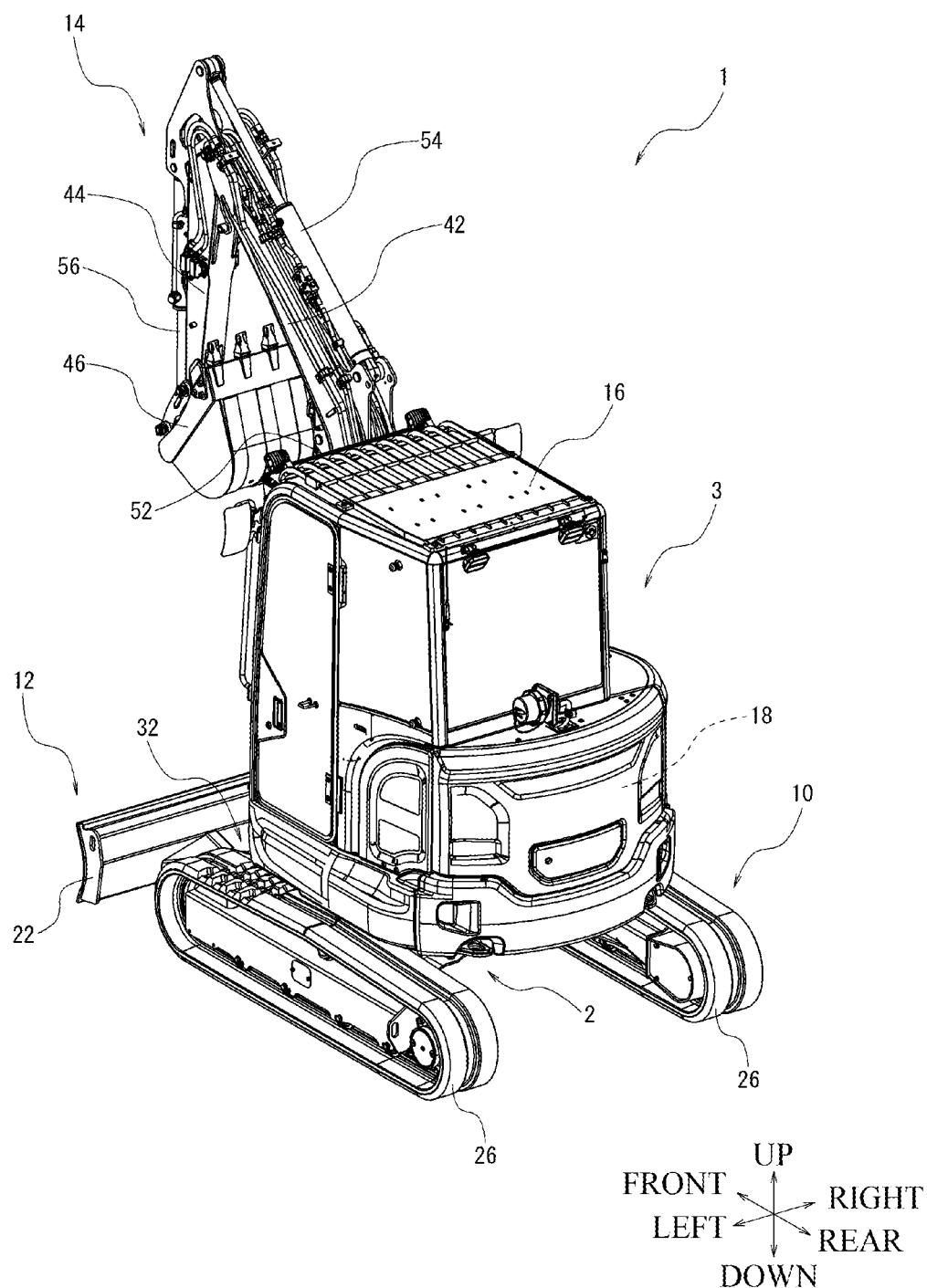
FIG. 1 is a perspective view illustrating an example of a working vehicle according to an embodiment of the present invention.

Referring to the drawings, an embodiment of the present invention will be described below in detail. FIG. 1 is a schematic view (perspective view from the left rear) illustrating an example of a working vehicle 1 according to the embodiment. Note that, for convenience of description, up and down, left and right, and front and rear directions may be indicated by arrows in the drawings. Throughout the drawings used in describing the embodiment, the same reference sign will be given to members having the same function, and repeated description thereof will be omitted in some cases.

First, a general configuration of the working vehicle 1 will be described. The working vehicle 1 will be described with an example of a hydraulic excavator. However, the working vehicle 1 is not limited to the hydraulic excavator.

As illustrated in FIG. 1, the working vehicle 1 includes a vehicle body, which includes a lower body 2 and an upper body 3 disposed on the lower body 2 (note that the lower body 2 and the upper body 3 may have a one-piece configuration).

The working vehicle 1 includes working units 12, 14 mounted to the lower body 2 or the upper body 3 and operated hydraulically (hydraulic oil having a predetermined pressure). The lower body 2 includes a travel unit 10 configured to travel. The upper body 3 includes a cab 16 at the front, where an operating unit to be used by an operator getting therein for traveling or manipulating the work. As an example, without limitation, the cab 16 is sealed.

An example of the travel unit 10 includes a pair of crawlers (tracks) 26 on the left and right. The travel unit 10, however, is not limited to the crawlers 26. As another example, the working vehicle 1 may be configured to have wheels instead of the crawlers 26 (not illustrated). The crawlers 26 are driven (traveled) by a traveling hydraulic motor (not illustrated).

As an example of the working unit 12, a blade 22 is provided. The blade 22 is attached to the lower body 2 in such a way as to be able to swing upward and downward (including forward and backward components). The blade 22 is driven by a hydraulic cylinder (blade cylinder) 32. However, the working unit 12 is not limited to the above configuration.

As an example of the working unit 14, a boom 42, an arm 44, and an attachment (in this embodiment, a bucket) 46 are provided. However, the attachment 46 is not limited to the bucket. The boom 42 is attached to the upper body 3 in such a way as to be able to swing upward and downward (including forward and backward components). In this embodiment, a boom bracket (not illustrated) is provided between the upper body 3 and the boom 42. The boom bracket enables the boom 42 to swing to the left and right (including forward and backward components) in relation to the upper body 3. The boom bracket may be omitted. The arm 44 is attached to the boom 42 in such a way as to be able to swing upward and downward (including forward and backward components). The attachment 46 is attached to the arm 44 in such a way as to be able to swing upward and downward (including forward and backward components). The boom 42 is driven by a hydraulic cylinder (boom cylinder) 52. The arm 44 is driven by a hydraulic cylinder (arm cylinder) 54. The attachment 46 is driven by a hydraulic cylinder (bucket cylinder) 56. However, the working unit 14 is not limited to the above configuration.

A drive mechanism for driving the above-described traveling hydraulic motor and each hydraulic cylinder includes, for example, a hydraulic pump, a control valve, etc., driven by a drive source 18. The operator operates the operating unit and activates the control valve to control the supply of the hydraulic oil at a predetermined pressure delivered from the hydraulic pump to a traveling hydraulic motor and each hydraulic cylinder. This allows the travel by the travel unit 10 and work by the working units 12, 14. One or more hydraulic pumps that constitute the drive mechanism are provided depending on the configurations and the loads of the working units 12, 14 and the travel unit 10.

Note that other mechanisms for the travel and work of the working vehicle 1 of the embodiment are the same as those in the known working vehicles (hydraulic excavators), so detailed descriptions will be omitted.

The working vehicle 1 includes an electric motor as the above-described drive source 18. One or more of the electric motors that constitute the drive source 18 are provided depending on the number, the rated output, etc., of the above-described hydraulic pumps. As another example of the drive source 18, an engine (internal combustion engine that burns fuel) may be provided instead of or together with the electric motor (not illustrate).

The working vehicle 1 includes an on-board charger that supplies power to the electric motor 18, rechargeable battery, conversion devices (inverter, etc.), and a control unit (not illustrated).

The working vehicle 1 includes a cab heater (not illustrated) for heating the cab 16. In the embodiment, since the electric motor is provided as the drive source 18 (that is, the engine that is used as the drive source and the heat source is not provided), the cab heater includes a heater core and a liquid heater for heating liquid (cooling water (liquid) for the cab heater) that flows through the heater core.

The working vehicle 1 also includes a storage part in which the liquid required for operating equipment mounted on the vehicle body (upper body 3) is stored, and a filler port for filling the liquid. Examples of the liquid include hydraulic oil stored mainly in a hydraulic oil tank and used for driving the traveling hydraulic motor and each hydraulic cylinder. Examples of the liquid also include windscreen washer fluid stored mainly in a washer fluid tank and used for washing a windscreen of the cab 16. Examples of the liquid also include cooling water for the cab heater stored in a cooling water storage part and used as heat medium of the cab heater. The cooling water storage part according to the embodiment has a configuration having no dedicated tank but storing (and circulating) liquid within equipment in which the liquid flows through (the liquid heater, the heater core for the cab heater, and hoses connected thereto, etc.). Note that a configuration including the dedicated tank is also applicable (not illustrated).

Figure 2:
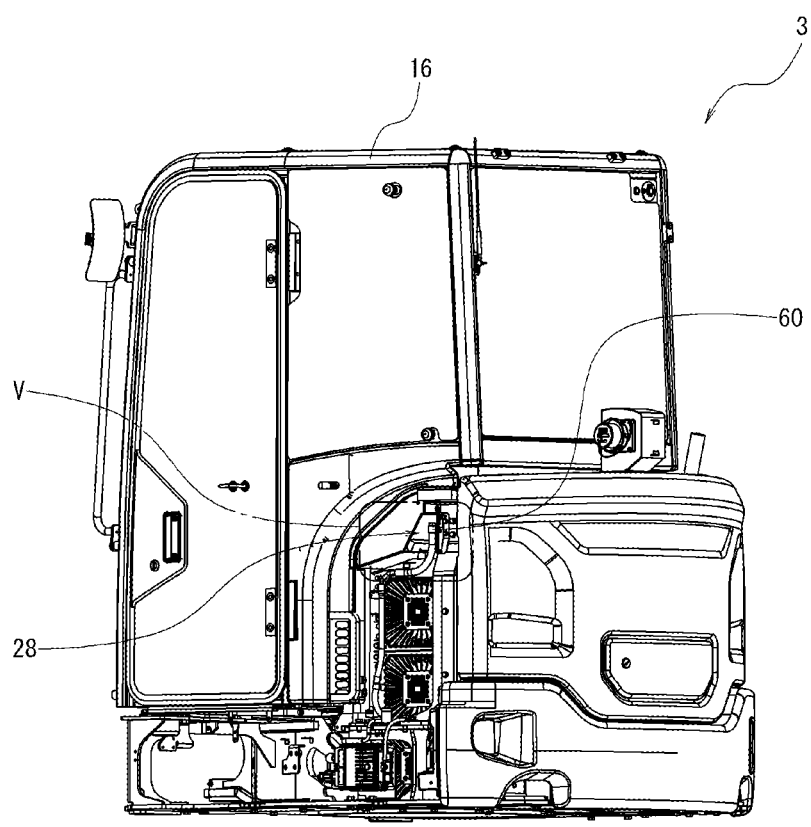
FIG. 2 is a perspective view illustrating positions of a filler port and a storage section of the working vehicle in FIG. 1.
Figure 3:
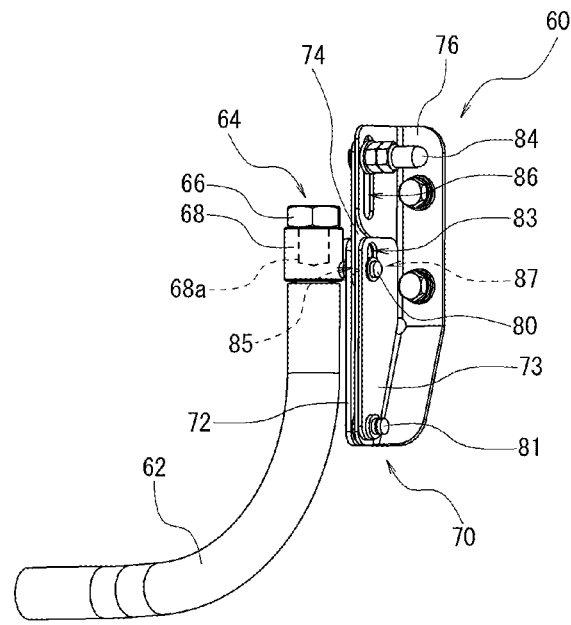
FIG. 3 is a perspective view of the filler port (stored state).
Figure 4:
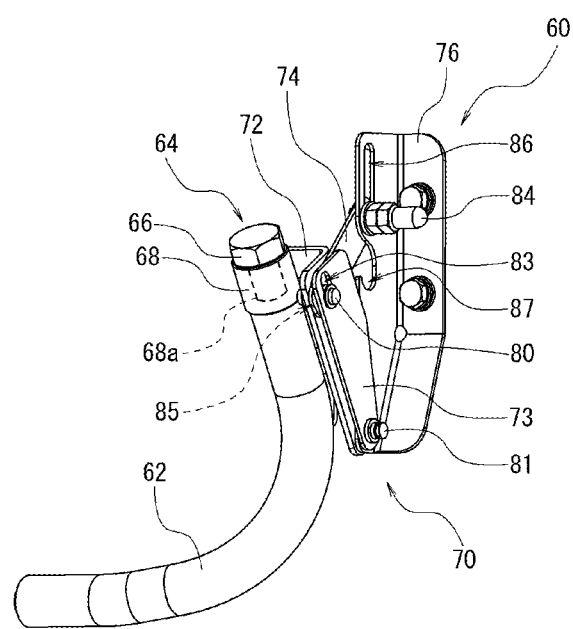
FIG. 4 is a perspective view of the filler port (pulled out state).

As an example, a configuration of the filler port 60 for filling cooling water for the cab heater will be described in detail. FIG. 2 is a perspective view (perspective view from the left rear) illustrating the positions of the filler port 60 and the storage section 28 of the vehicle body (upper body 3) (the left side cover is not illustrated). FIG. 3 is a perspective view of the filler port 60 (stored in the storage section 28). FIG. 4 is a perspective view of the filler port 60 (pulled out from the storage section 28).

The filler port 60 includes a resiliently deformable hose 62 which communicates, either directly or via a relay hose, with the liquid storage part (in the embodiment, the liquid heater, the heater core for the cab heater, and the hose connected thereto, etc.). The filler port 60 includes a lid mechanism 64 mounted to an upper end of the hose 62 for opening and closing the port. The filler port 60 includes a moving mechanism 70 configured to move the position of the lid mechanism 64 and the hose 62 continuing from the lid mechanism 64.

The lid mechanism 64 and the hose 62 continuing from the lid mechanism 64 are stored in the storage section 28 provided in the vehicle body (upper body 3) in a state of being pushed into the vehicle body (upper body 3) from the outside toward the inside.

As an example, the lid mechanism 64 includes a plug for the hose 66 and a plug fixing part 68 having a threaded hole (a through hole with a female thread formed in an inner wall) 68*a* in which the plug for the hose 66 is screwed. The plug fixing part 68 is mounted to the upper end of the hose 62. By engaging and disengaging the plug for the hose 66 with the screw hole 68*a*, the upper end of the hose 62 can be opened and closed.

As in the embodiment, the working vehicle 1 driven by the electric motor is not equipped with a radiator for cooling the engine such as the working vehicle driven by the engine, and thus is not configured to use cooling water for the radiator also as cooling water for the cab heater. Therefore, as described above, the liquid heater for heating the cooling water for the cab heater is provided. Both of the temperature and the pressure of the cooling water for the cab heater heated by the liquid heater may be set to be lower than those for the engine-driven working vehicle in which the cooling water for the radiator is used also as the cooling water for the cab heater. Therefore, the lid mechanism 64 does not require a pressure cap and can be configured with a simple mechanism.

As an example, the hose 62 is formed by using transparent or translucent material (for example, silicone rubber) that provides visibility of the liquid level of the liquid (cooling water for the cab heater). In this configuration, a liquid amount can be confirmed at a hose portion without providing a dedicated indicator or a measuring device.

As an example, the moving mechanism 70 includes a fixing part 72 which is coupled pivotably with respect to the vehicle body (upper body 3) and to which the lid mechanism 64 (or may be the hose 62) is secured. Note that a reference numeral 81 in the drawing denotes a pivotal shaft member which allows the fixing part 72 to pivot with respect to the vehicle body (upper body 3). The moving mechanism 70 includes an operating part 74 that is coupled pivotably with respect to the fixing part 72 and having a knob 84 that is held by the operator. The moving mechanism 70 is fixed to the vehicle body (upper body 3) and includes a slide support 76 having a sliding hole (first sliding hole) 86 that slidably inserts the knob 84 therethrough to define a sliding range, and an upwardly opening (that is, in a U-shape in side view) locking recess 87. The sliding range of the sliding hole (first sliding hole) 86 defines the movable range of the lid mechanism 64 (and the hose 62 continuing from the lid mechanism 64).

Furthermore, the moving mechanism 70 includes a locking projection 80 configured to be engaged with and disengaged from the locking recess 87 of the slide support 76. In the embodiment, the locking projection 80 is configured to be fixed to the fixing part 72, and thus an insertion hole (first insertion hole) 85, which rotatably receives an insertion of the locking projection 80, is formed through the operating part 74. Therefore, if the operating part 74 is lifted, the locking projection 80 rises. As another example, the locking projection 80 may be configured to be fixed to the operating part 74, and thus an insertion hole (second insertion hole), which rotatably receives an insertion of the locking projection 80 may be formed through the fixing part 72 (not illustrated). In this configuration as well, if the operating part 74 is lifted, the locking projection 80 rises.

Note that a reference numeral 73 in the drawing denotes a support plate that moves in association with the fixing part 72. The support plate 73 is provided with a sliding hole (second sliding hole) 83 that slidably receives an insertion of the locking projection 80. A configuration without the support plate 73 is also applicable (not illustrated).

According to the moving mechanism 70 described above, the filler port 60 that can be moved in position without the use of tools is implemented with a simple configuration. Since the filler port 60 can be moved, storage of the filler port 60 is achieved only by securing a space having at least a size equivalent to a profile of the lid mechanism 64 and the hose 62 in the vehicle body (upper body 3). In addition, when filling, the lid mechanism 64 (and the hose 62 extending continuously therefrom) can be pulled out from the inside to the outside of the vehicle body (upper body 3) to supply liquid (the cooling water for the cab heater in the embodiment). Therefore, it is not necessary to provide a large space for the entry of a filler nozzle and container above the filler port 60, thereby achieving reduction in size of the vehicle body (upper body 3).

Figure 5A:
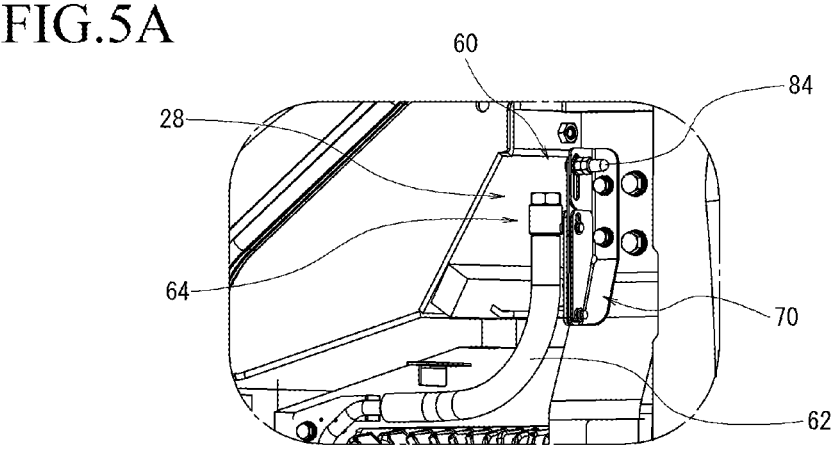
Figure 5B:
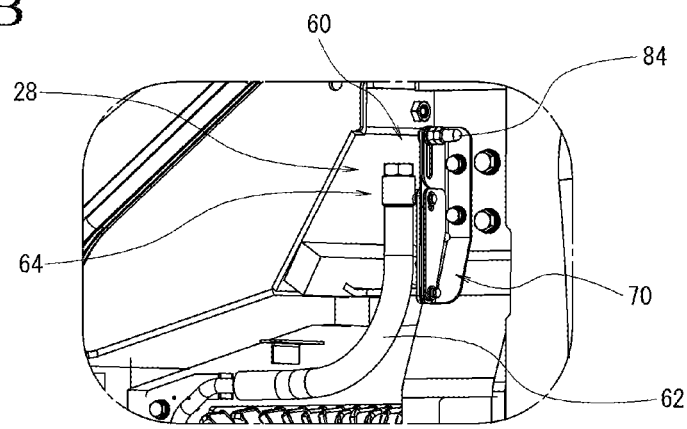
Figure 5C:
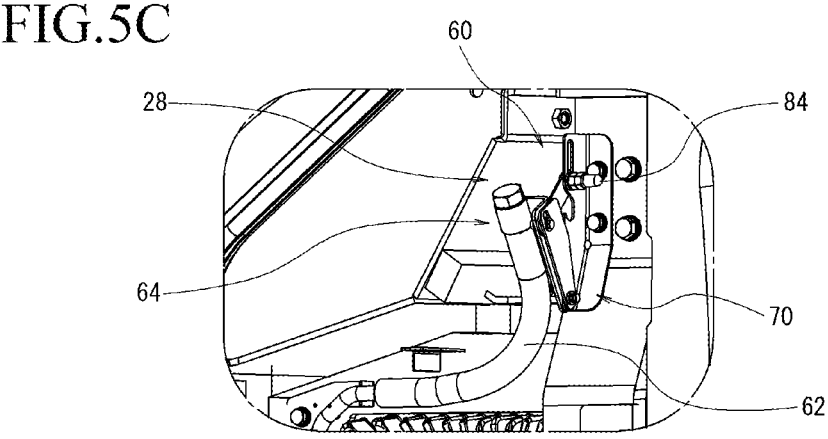

Referring now to FIG. 5A to FIG. 5C, an operation to move the filler port 60 of the working vehicle 1 will be described. Note that all of FIG. 5A to FIG. 5C are drawings corresponding to the position V in FIG. 2. As illustrated in FIG. 5A, the lid mechanism 64 and the hose 62 continuing from the lid mechanism 64 are stored in the storage section 28 provided in the vehicle body (upper body 3) in the state of being pushed into the vehicle body (upper body 3) from the outside toward the inside. In this condition, the locking projection 80 engages the locking recess 87 of the slide support 76. Accordingly, the lid mechanism 64 and the hose 62 continuing from the lid mechanism 64 are restricted from moving. Next, as illustrated in FIG. 5B, when the operator lifts the knob 84 of the operating part 74, the locking projection 80 rises and is disengaged from the locking recess 87. In other words, the lid mechanism 64 and the hose 62 continuing from the lid mechanism 64 are not restricted from moving. Next, as illustrated in FIG. 5C, in the state in which the locking projection 80 is disengaged from the locking recess 87, the lid mechanism 64 and the hose 62 continuing from the lid mechanism 64 are moved from the inside toward the outside of the vehicle body (upper body 3) by the operator holding and pulling out the lid mechanism 64 and the hose 62 continuing from the lid mechanism 64 as one example, or by one or both of the resilient force of the hose 62 and the gravitational force acting on the center of gravity of the lid mechanism 64 as another example. In the embodiment, the fixing part 72, the operating part 74 and the slide support 76 mounted to the vehicle body (upper body 3) are positioned so that such move is enabled. Accordingly, a state in which the filler port 60 can be moved from an inner part to an outer part of the vehicle body (upper body 3) is achieved by the operator without the use of tools, but simply by lifting the knob 84 of the operating part 74 upward to unlock.

In contrast, to store the filler port 60 into the storage section 28, the operator pushes the lid mechanism 64 or the hose 62 into the vehicle body (upper body 3) to move from the outside toward the inside.

As described thus far, according to the present invention, the filler port 60 that can be moved in position without the use of tools, can be stored in a small space, and can be pulled out to supply liquid at the time of filling is implemented. Therefore, reduction in size of the vehicle bodies 2, 3 is achieved.

With the cooling water for the cab heater as an example of the liquid required for operating equipment mounted on the vehicle bodies 2, 3, the configuration of the filler port 60 for filling the cooling water for the cab heater has been described. The configuration of the filler port 60 is not limited to this example. The configuration of the filler port 60 may be applied to a filler port for supplying hydraulic oil used for operating the traveling hydraulic motor and each hydraulic cylinder. The configuration of the filler port 60 may be applied to a filler port for supplying windscreen washer fluid used for operating a windscreen washing mechanism.

A working vehicle using an electric motor as a drive source is exemplified as the working vehicle 1. The configuration of the filler port 60 is not limited to this example, and may be applied to the working vehicles that uses an engine (internal combustion engine) as a drive source. The configuration of the filler port 60 may be applied to a filler port for supplying fuel used for operating engines. The configuration of the filler port 60 may be applied to a filler port for supplying engine oil used for operating engines. The configuration of the filler port 60 may be applied to a filler port for supplying the cooling water for the radiator used for operating radiators.

The present invention is not limited to the working vehicle described above (hydraulic excavator). The present invention may be applied to other working vehicles (such as track loaders, tracked dumper, etc.).

What is claimed is:

1. A working vehicle having a vehicle body, a travel unit, and a hydraulically operated working unit, comprising:
   a filler port for supplying liquid required for operating equipment mounted on the vehicle body,
   wherein the filler port includes a resiliently deformable hose in communication with a storage part of the liquid,
   wherein a lid mechanism is mounted to an upper end of the hose and configured to open and close the filler port, and a moving mechanism configured to move the position of the lid mechanism and the hose continuing from the lid mechanism,
   wherein the moving mechanism comprises:
      a fixing part which is pivotably coupled to the vehicle body and to which the lid mechanism or the hose is fixed;
      an operating part pivotably coupled to the fixing part and including a knob to be held by an operator;
      a slide support fixed to the vehicle body and including a sliding hole configured to slidably insert the knob therethrough and define a sliding range and a locking recess opening upward; and
   a locking projection provided on the fixing part or the operating part and configured to be engaged with and disengaged from the locking recess.

2. The working vehicle according to claim 1, wherein the hose is formed of a transparent or translucent material that provides visibility of a liquid level of the liquid.

3. The working vehicle according to claim 2, further comprising: an electric motor serving as a drive source for the travel unit or the working unit,
   wherein the liquid is cooling water for the cab heater, and
   wherein the lid mechanism includes a plug for the hose and a plug fixing part having a threaded hole to which the plug for the hose is screwed.

4. The working vehicle according to claim 2, comprising: an engine serving as a drive source for the travel unit or the working unit,
   wherein the liquid is at least one of fuel and engine oil.

5. The working vehicle according to claim 2, wherein the liquid is at least one of hydraulic oil and windscreen washer fluid.

6. The working vehicle according to claim 1,
   wherein the lid mechanism and the hose continuing from the lid mechanism are stored in a state of being pushed into the vehicle body from outside toward inside, and
   wherein the fixing part, the operating part, and the slide support of the moving mechanism mounted to the vehicle body are positioned so that, in a state in which the operator lifts the knob upward and the locking projection is disengaged from the locking recess, the lid mechanism and the hose continuing from the lid mechanism move from the inside toward the outside of the vehicle body either by an operator holding and pulling out the lid mechanism or the hose continuing from the lid mechanism, or by a resilient force of the hose or a gravitational force acting on a center of gravity of the lid mechanism.

7. The working vehicle according to claim 6, further comprising: an electric motor serving as a drive source for the travel unit or the working unit,
   wherein the liquid is cooling water for the cab heater, and
   wherein the lid mechanism includes a plug for the hose and a plug fixing part having a threaded hole to which the plug for the hose is screwed.

8. The working vehicle according to claim 6, comprising: an engine serving as a drive source for the travel unit or the working unit,
   wherein the liquid is at least one of fuel and engine oil.

9. The working vehicle according to claim 6, wherein the liquid is at least one of hydraulic oil and windscreen washer fluid.

10. The working vehicle according to claim 1, further comprising: an electric motor serving as a drive source for the travel unit or the working unit,
    wherein the liquid is cooling water for the cab heater, and
    wherein the lid mechanism includes a plug for the hose and a plug fixing part having a threaded hole to which the plug for the hose is screwed.

11. The working vehicle according to claim 1, comprising: an engine serving as a drive source for the travel unit or the working unit,
    wherein the liquid is at least one of fuel and engine oil.

12. The working vehicle according to claim 1, wherein the liquid is at least one of hydraulic oil and windscreen washer fluid.

\* \* \* \* \*